US006502081B1

(12) United States Patent
Wiltshire, Jr. et al.

(10) Patent No.: US 6,502,081 B1
(45) Date of Patent: Dec. 31, 2002

(54) SYSTEM AND METHOD FOR CLASSIFYING LEGAL CONCEPTS USING LEGAL TOPIC SCHEME

(75) Inventors: James S. Wiltshire, Jr., Springboro, OH (US); John T. Morelock, Beavercreek, OH (US); Timothy L. Humphrey, Kettering, OH (US); X. Allan Lu, Springboro, OH (US); James M. Peck, Rockville, MD (US); Salahuddin Ahmed, San Diego, CA (US)

(73) Assignee: Lexis Nexis, Dayton, OH (US)

( * ) Notice: Subject to any disclaimer, the term of this patent is extended or adjusted under 35 U.S.C. 154(b) by 249 days.

(21) Appl. No.: 09/633,266

(22) Filed: Aug. 4, 2000

Related U.S. Application Data

(60) Provisional application No. 60/147,389, filed on Aug. 6, 1999.

(51) Int. Cl.[7] .............................................. G06F 15/18
(52) U.S. Cl. ........................................ 706/12; 707/500
(58) Field of Search .............................. 706/45, 46, 12; 707/500; 700/90

(56) References Cited

PUBLICATIONS

Borko, Harold et al., Automatic Document Classification, System Development Corp.; Nov. 1962, pp. 152–162.

Jones, Karen Sparck, Some Thoughts on Classification for Retrieval, University Mathematical Laboratory, Cambridge, MA, The Journal of Documentation, vol. 26, No. 2; Jun. 1970, pp. 89–101.

Griffiths, Alan et al., Hierarchic Agglomerative Clustering Methods for Automatic Document Classification, University of Sheffield, Western Bank, Sheffield, UK, The Journal of Documentation, vol. 40, No. 3; Sep. 1984, pp. 175–205.

Willett, Peter, Recent Trends in Hierarchic Document Clustering: A Critical Review, University of Sheffield, Western Bank, Sheffield, UK, Information Processing & Management, vol. 24, No. 5; 1988, pp. 577–597.

Salton, Gerard et al., Flexible Text Matching for Information Retrieval, Department of Computer Science, Cornell University, Ithaca, NY; Sep. 1990, pp. 1–30.

Farkas, Jennifer, Neural Networks and Document Classification, Centre for Information Technologies Innovation (CITI), Laval, Quebec, Canada; 1993, pp. 1–5.

Buckley, Chris et al., Automatic Routing and Ad–hoc Retrieval Using SMART: TREC 2, Department of Computer Science, Cornell University, Ithaca, NY; pp. 45–55, No date.

Lewis, David D. et al., A Sequential Algorithm for Training Text Classifiers, AT&T Bell Laboratories, Murray Hill, NJ; pp. 1–12, No date.

*Primary Examiner*—Thomas Black
*Assistant Examiner*—Joseph P Hirl
(74) *Attorney, Agent, or Firm*—Jacobson Holman PLLC

(57) ABSTRACT

An economic, scalable machine learning system and process perform document (concept) classification with high accuracy using large topic schemes, including large hierarchical topic schemes. One or more highly relevant classification topics is suggested for a-given document (concept) to be classified. The invention includes training and concept classification processes. The invention also provides methods that may be used as part of the training and/or concept classification processes, including: a method of scoring the relevance of features in training concepts, a method of ranking concepts based on relevance score, and a method of voting on topics associated with an input concept. In a preferred embodiment, the invention is applied to the legal (case law) domain, classifying legal concepts (rules of law) according to a proprietary legal topic classification scheme (a hierarchical scheme of areas of law).

20 Claims, 8 Drawing Sheets

SYSTEM AND METHOD FOR CLASSIFYING LEGAL CONCEPTS USING LEGAL TOPIC SCHEME

This application claims the benefit of Provisional Application No. 60/147,389, filed Aug. 6, 1999.

COPYRIGHT NOTICE

A portion of this disclosure, including Appendices, is subject to copyright protection. Limited permission is granted to facsimile reproduction of the patent document or patent disclosure as it appears in the U.S. Patent and Trademark Office (PTO) patent file or records, but the copyright owner reserves all other copyright rights whatsoever.

BACKGROUND OF THE INVENTION

1. Field of the Invention

The present invention relates to systems and methods for automated classification. More specifically, the invention relates to automated systems and methods for classifying concepts (such as legal concepts, including points of law from court opinions) according to a topic scheme (such as a hierarchical legal topic classification scheme).

2. Related Art

Document classification has long been recognized as one of the most important tasks in text processing. Classification of documents provides for quality document retrieval, and enables browsing and linking among documents across a collection. The benefits of such easy access are especially apparent in slowly-evolving subject domains such as law. The generally stable vocabularies and topics of the legal domain insure long-term return on any classification work.

There are two broad document classification approaches: unsupervised learning and supervised learning. The approaches are differentiated by whether a pre-defined classification scheme is used.

Unsupervised learning is a data-driven classification approach, based on the assumption that documents can be well organized by a natural structure inherent to the data. Those familiar with the data should be able to follow this natural structure to locate their information. A large body of information retrieval literature has focused on this approach, mostly related to document clustering [Borko 1963, Sparck Jones 1970, van Rijsbergen 1979, Griffiths 1984, Willett 1988, Salton 1990]. More recently some machine learning techniques have been applied to this classification task [Farkas 1993]—the term "unsupervised learning" was coined to describe this approach. The following patents are associated with this approach: U.S. Pat. No. 5,182,708 and U.S. Pat. No. 5,832,470.

Opposite to the unsupervised learning approach to document classification is supervised learning. With this approach, a pre-defined "topic scheme" is given, along with the classified documents for each topic in the scheme. The topic scheme may be a simple list of discrete topics, or a complex hierarchical topic scheme. Supervised learning technology focuses on the task of feeding a computer meaningful topical descriptions so that it can learn to classify a document of unknown type.

When a topic scheme includes a simple list of discrete topics (one without a complex hierarchical relationships among the topics), the document classification becomes mere document categorization. Many machine learning techniques, including the retrieval technique of relevance feedback, have been tried for this task [Buckley 1994, Lewis 1994, and Mitchell 1997]. In addition to the effectiveness of learning methods themselves, the success of automatic categorization depends on the number of topics in the scheme, on the amount of quality training documents, and on the degree that the topics are mutually exclusive to one another. An example is disclosed in U.S. Pat. No. 5,675,710.

The more difficult document classification centers on classifying documents using a hierarchical topic scheme. In this task, one has to consider horizontal relationships among the sister topics, which tend to be close to each other and are thus confusing to a computer. Moreover, one must also be concerned with vertical inheritance relationships.

Many machine learning techniques have trouble accommodating these two semantic relationships simultaneously in their learning or training, and thereafter have difficulty in classifying documents effectively. The task becomes more challenging if the topic scheme is very large, if the training documents are not topically exclusive, if the size of documents is small, or if the documents lack descriptive information.

To face these challenges, some techniques (U.S. Pat. No. 5,204,812) have relied on human intervention. Others (U.S. Pat. No. 5,794,236) use simple but insightful pattern matching. Still others (U.S. Pat. Nos. 5,371,807 and 5,768,580) turn to linguistic knowledge to combat the ambiguity introduced in the hierarchical scheme.

However, these techniques can only handle small, domain-specific classification work. They have difficulty in scaled processing, either because of their simplicity in pattern recognition or because of the daunting demand of building expensive lexicons to support the linguistic parsing.

Thus, there is a need in the art to develop an economic, scalable machine learning process that can perform document classification with high accuracy using a large, hierarchical topic scheme. It is to meet this need that the present invention is directed.

Non-Patent References mentioned above:

Borko, H. and Bernick M. 1963. "Automatic document classification." *Journal of the Association for Computing Machinery*, pp. 151–161.

Sparck Jones, K. 1970. "Some thoughts on classification for retrieval." *Journal of Documentation*, pp.89–102.

Van Riusbergen, C. J. 1979. *Information Retrieval*, 2nd edition, Butterworths, London.

Griffiths, A and others. 1984. "Hierarchic agglomerative clustering methods for automatic document classification." *Journal of Documentation*, pp. 175–205.

Willett, P. 1988. "Recent trends in hierarchic document clustering: A critical review." *Information Processing and Management*, pp. 577–598.

Salton, G. and Buckley C. 1990. "Flexible text matching for information retrieval." Technical Report 90–1158, Cornell University, Ithaca, N.Y.

Farkas, J. 1993. "Neural networks and document classification." *Canadian Conference on Electrical and Computer Engineering*, pp. 1–4.

Buckley, C and others. 1994. "Automatic routing and ad-hoc retrieval using SMART: TREC-2." *The 2nd Text Retrieval Conference*, edited by Donna Harman, NIST Special Publication 500–215, pp.45–55.

Lewis, D. D. and Gale, W. A. 1994. "A sequential algorithm for training text classifiers." *Proceedings of the 7th Annual International ACM-SIGIR Conference on Research and Development in Information Retrieval*, pp.3–12, London.

Mitchell, T. 1997. Machine Learning, McGraw Hill, New York.

SUMMARY OF THE INVENTION

The inventive system and method provide an economic, scalable machine learning process that performs document classification with high accuracy using large topic schemes, including large hierarchical topic schemes. More specifically, the inventive system and method suggest one or more highly relevant classification topics for a given document to be classified.

The invention provides several features, including novel training and concept classification processes. The invention also provides novel methods that may be used as part of the training and/or concept classification processes, including: a method of scoring the relevance of features in training concepts, a method of ranking concepts based on relevance score, and a method of voting on topics associated with an input concept.

In a preferred embodiment, the invention is applied to the legal (case law) domain, classifying legal concepts (such as rules of law) according to a proprietary legal topic classification scheme (a hierarchy of areas of law).

Other objects, features and advantages of the present invention will be apparent to those skilled in the art upon a reading of this specification including the accompanying drawings.

BRIEF DESCRIPTION OF THE DRAWINGS

The invention is better understood by reading the following Detailed Description of the Preferred Embodiments with reference to the accompanying drawing figures, in which like reference numerals refer to like elements throughout, and in which.

DETAILED DESCRIPTION OF THE PREFERRED EMBODIMENTS

Figure 1:
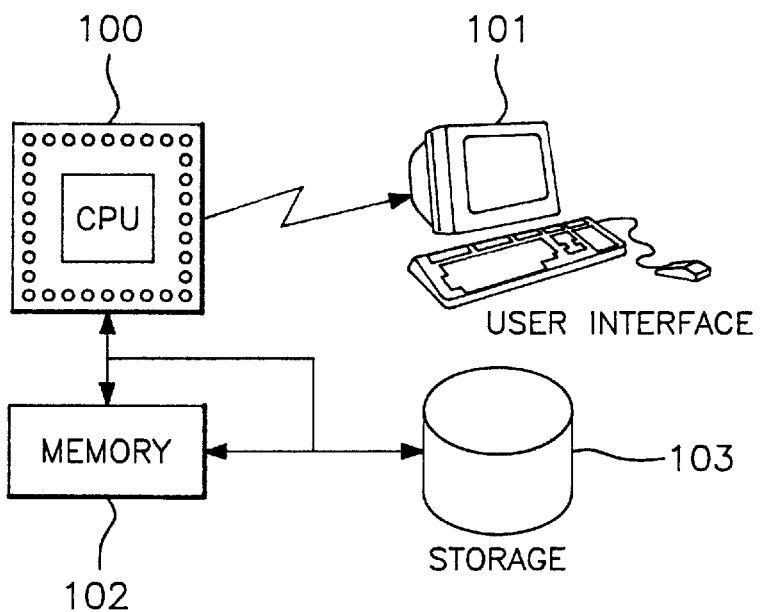
FIG. 1 illustrates an exemplary hardware configuration in which the inventive classification system and method may be implemented.

In describing preferred embodiments of the present invention illustrated in the drawings, specific terminology is employed for the sake of clarity. However, the invention is not intended to be limited to the specific terminology so selected, and it is to be understood that each specific element includes all technical equivalents that operate in a similar manner to accomplish a similar purpose.

Background Terminology.

As background to understanding the inventive system and method, it is understood that preferred embodiments classify "legal concepts" in a case law document (court opinion), using machine-based learning techniques. Then, the classification process is carried out according to a pre-defined scheme of "legal topics."

In particular, a "concept" in the legal domain, called a "legal concept," may be more widely known as a "rule of law." A topic in the legal domain, called a "legal topic," may be more widely known as an "area of law." Of course, the invention can be applied to domains other than the legal domain, and the broad terms "concept" and "topic" should not be limited to the legal domain.

Referring to the particular embodiment that is applied to the legal domain, case law documents must each have a set of distinct legal concepts. In a particular preferred embodiment, "legal concepts" may be defined as "controlling points of law, material to the disposition of the case, stated in the language of the court." Typically, a judicial opinion passage contains a legal concept if:

1. The passage is a positive statement of a rule of law, such as:
    a direct expression of a legal principle (the test, the elements, the general rule, the exception to the general rule, etc.)
    a definition of a legal term of art
    a statement of the applicable standard of review
    an express statement that another case is overruled or disapproved
    an interpretation or construction-not just a quotation-of a statute or court rule
2. The rule of law stated is significant to the court's resolution of the case.
3. The court expressly or implicitly adopts the stated rule of law as its own.

A sample set of legal concepts is shown in Appendix A. A sample scheme of legal topics is shown in Appendix B. While this sample scheme is hierarchical in nature (with general top-level topics and more specific lower-level topics), this invention is not limited to this type of scheme.

With this terminology understood, the invention is first described in general terms, followed by a more detailed explanation.

Overview.

A preferred embodiment of the present invention provides a legal concept classification system and method that analyze text of a concept from a legal document and provide relevant topics for the legal concept from a given legal topic scheme. The invention uses a database of legal concepts previously classified according to the legal topic scheme, a list of legal phrases, and a list of stopwords.

The preferred embodiment involves two major processes to provide topics for legal concepts: training, and classifying. The system is first trained to distinguish topic trends in legal concepts according to the given topic scheme. Once trained, the system then classifies other legal concepts according to this same topic scheme.

Training Process—Overview.

The process of training involves:
  gathering of training data,
  extraction of previously-classified legal concepts, analysis of the "features" in the training data, calculation of relevance scores for these features, and storage of this information in a knowledge base.

This training must be done to initially create information in the knowledge base, but it is envisioned that training may occur throughout the life of the application with feedback of newly classified legal concepts, to continually improve the quality of the knowledge base.

A plurality of case law documents is parsed, extracting classified legal concepts from the appropriate section of the document. This requires a considerable sample of case law documents from which legal concepts have been extracted and classified according to the same topic scheme.

Once extracted from the case, legal concepts are analyzed to determine the distinguishing "features" of these concepts. In a particular embodiment, the features for the training and classification processes have been identified:

Terms

Legal phrases

Case cites

The creation of these features from the classified legal concepts is best understood with the following hypothetical example: a legal topic, followed by a legal concept as might be found in a case:

Criminal Law & Procedure—Evidence—Opinion Testimony

It is the role of the factfinder, not the appellate courts, to judge the credibility of witnesses, or lack thereof, and to decide whether to accept such testimony or to disregard it entirely; the appellate court must view the evidence in a light most favorable to the jury's verdict, as noted in Smith v. Ohio.

This legal concept's topic (Criminal Law & Procedure-Evidence—Opinion Testimony) is from a hierarchical (multi-tiered) legal topic scheme. More specifically:

the top-tier topic, the most general, is "Criminal Law & Procedure";

the $2^{nd}$-tier topic, more specific, is "Evidence"; and the $3^{rd}$-tier, the most specific, "Opinion Testimony".

From the text of this legal concept, the term features are extracted, excluding meaningless "stop-words" and depluralizing to normalize terms. For example, the terms likely to be significant features from the above sample legal concept might be "credibility", "witness", or "disregard". The citation Smith v. Ohio would be extracted as a case cite feature. A legal phrase in this sample legal concept would be "appellate courts". If available, opinion text identified to be relevant to each legal concept is also scanned to find relevant case citations. Of course, the exact usage of these features relative to the learning processes to be described should not limit the scope of the invention.

Once extracted and analyzed, relevance scores are calculated for each feature in each concept. This step of the training process uses a learning step based on a relevance-ranked text retrieval process. This step defines the relevance of features using frequency of the features, both within each legal concept and across the entire set of training legal concepts. These two frequencies—within a legal concept and across the entire set—are combined to give a relevance score for each feature, for each legal concept. These legal concept relevance scores are then used to identify the most relevant topics for the candidate concept, during the classification process.

The features and their scores, along with links to their related legal concepts, are then stored in the knowledge base for use during the subsequent classification process.

Classification Process—Overview.

Once trained, the invention is used to classify previously-unclassified concepts such as legal concepts.

According to a preferred embodiment, this classification process involves a classification step that includes:

analyzing a "candidate" (or "target" or "input") legal concept for features, searching for similar training legal concepts in the knowledge base, ranking these similar concepts based on similarity to the candidate concepts, and voting to identify the most relevant topics from these similar legal concepts.

The candidate legal concept is analyzed for features. This step is identical to the analysis of features in classified legal concepts done during the training process. The same set of distinguishing features (terms, legal phrases, and case citations) used during training should be used in this step to be compatible with the knowledge base.

Next, the knowledge base is searched for training legal concepts similar in features to the target legal concept. These matching legal concepts are collated and ranked according to strength of match.

From these matching training legal concepts, the most relevant topics for the candidate legal concept are identified. Each legal concept in the knowledge base has at least one topic associated with it, so a list of topics is generated from the matching legal concepts. This topic list is sorted by relevance, and the most relevant topics chosen for the candidate legal concept.

The training process and the classification process (including the relevance-ranked classification step) having been described briefly above, the embodiments of the invention are now described in greater detail.

The inventive method is more easily understood with references to examples. The examples used herein primarily deal with classifying individual legal concepts of a case law document according to a particular hierarchical topic scheme, but this does not limit the scope of the present invention. In fact, any size text unit such as a sentence, passage, paragraph or an entire section of a document can be classified according to an arbitrary topic scheme.

Exemplary Hardware Embodiment.

Embodiments of the inventive training and classification system may be implemented as a software system including a series of modules on a conventional computer.

As shown in FIG. 1, an exemplary hardware platform includes a central processing unit 100. The central processing unit 100 interacts with a human user through a user interface 101. The user interface is used for inputting information into the system and for interaction between the system and the human user. The user interface includes, for example, a video display, keyboard and mouse. Memory 102 provides storage for data (such as the knowledge base, stop word list and legal phrase list) and software programs (such as the training and classification processes) that are executed by the central processing unit. Auxiliary memory 103, such as a hard disk drive or a tape drive, provides additional storage capacity and a means for retrieving large batches of information.

All components shown in FIG. 1 may be of a type well known in the art. For example, the system may include a SUN workstation including the execution platform SPARCsystem 10 and SUN OS Version 5.5.1, available from SUN MICROSYSTEMS of Sunnyvale, Calif. Of course, the system of the present invention may be implemented on any number of computer systems. Moreover, although the preferred embodiment uses the PERL language (for text parsing tasks) and C++ (for number crunching and database access tasks), any appropriate programming language may be used to implement the present invention.

The Training and Classification Processes.

Figure 2:
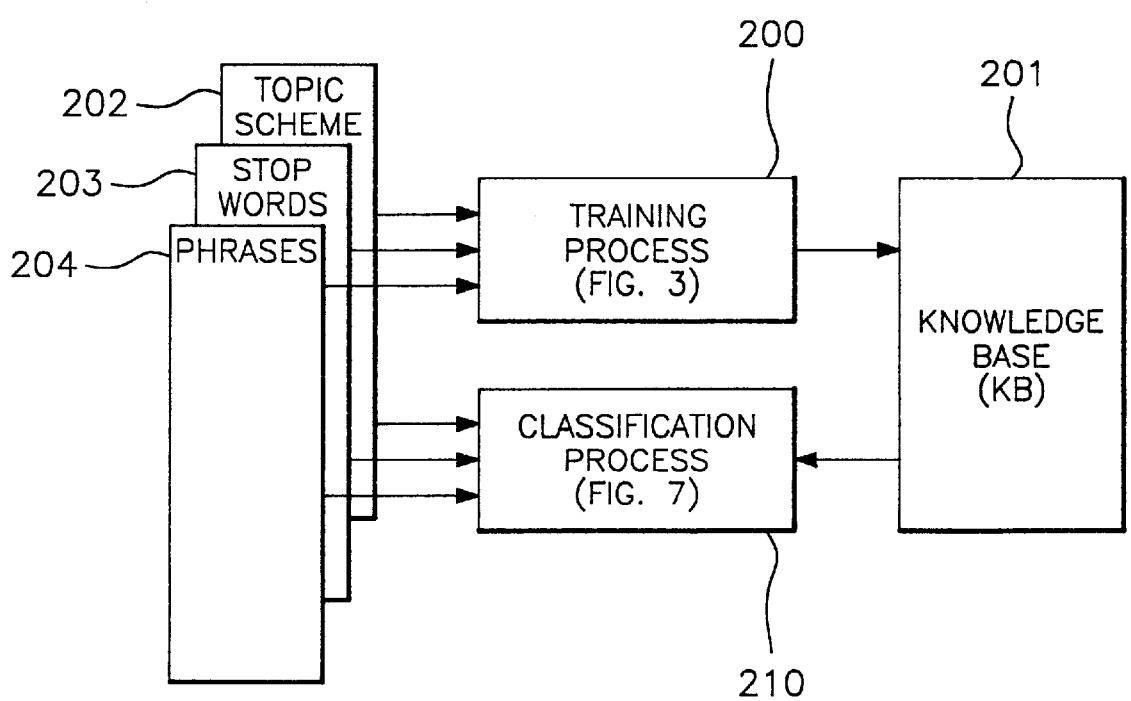
FIG. 2 is a high-level flow chart schematically indicating a training process 200 and a classification process 210, alongside a knowledge base 201, a topic scheme 202 and exemplary lists 203, 204 that are used in the processes.

Referring to FIG. 2, the preferred embodiment includes a two step process as shown in which the system is first trained (block 200) before it classifies legal concepts (in block 210).

A knowledge base 201 is utilized to store training results during the training process. The training results stored in the knowledge base during the training process are used in the subsequent classification process.

Both the training process and the classification process make use of a predetermined topic scheme 202 (see example of a legal topic scheme in Appendix B). In a particular preferred embodiment, the training process and the classification process also make use of a Stop Word List 203 (see example in Appendix C) and a Phrase List 204 (see example of a Legal Phrase List in Appendix D).

The Training Process.

Figure 3:
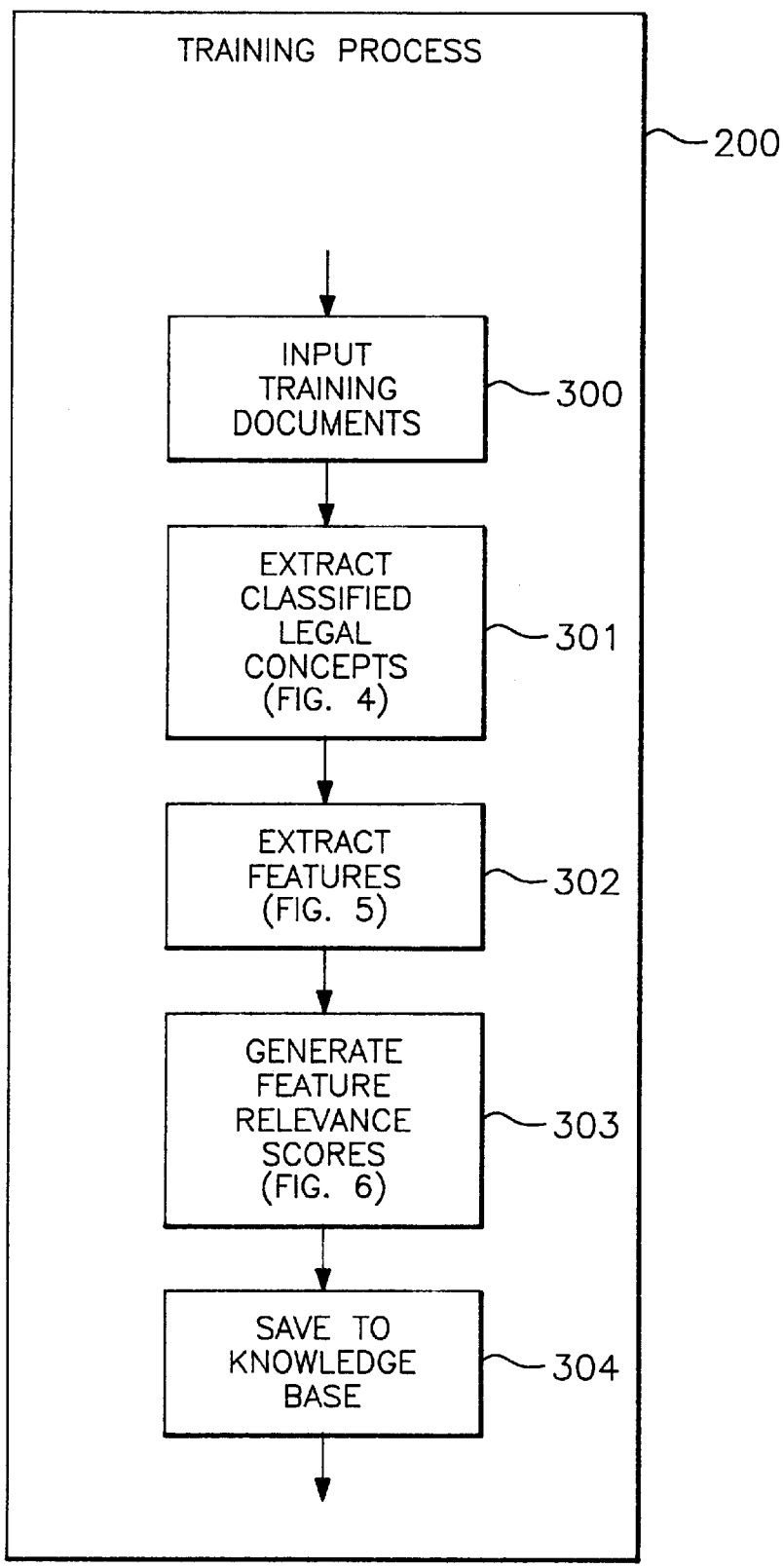
FIG. 3 is a flow chart indicating an exemplary training process 200 (FIG. 2).

The machine learning system is first trained, as shown in FIG. 3 and related figures, before it classifies legal concepts. This training requires case law documents with legal concepts identified, and each concept classified according to the target topic scheme.

The training process links the set of each legal concept's extracted features with that legal concept's associated topic(s). The following discussion describes an embodiment of the training process, based on a relevance-ranked approach.

The embodiment of the concept ranking step used in the training process uses frequency of occurrence of terms and features, both within each individual legal concept and across the entire set of legal concepts. Generally, a term or feature that occurs frequently within a legal concept is a strong indicator of the topic, unless that term or feature also frequently occurs in many other legal concepts. Intuitively, a highly common legal term, like "court" or trial", does not contribute to assigning a specific legal topic to a legal concept.

First, a plurality of previously classified training documents are input, as shown at block 300. Then, that plurality of case law documents is parsed to extract the legal concepts, as shown at block 301. "Features" (terms, legal phrases and embedded citations) of each legal concept are then extracted (block 302) and attached to the text in a manner suitable to the learning method being used. Relevance scores are then generated for these features (block 303). Finally, the results are stored (block 304) in knowledge base 201.

Referring more specifically to FIG. 3, these training steps are now discussed in more detail. Many of the steps in the training process are also used in the classification process that is discussed with reference to FIG. 7.

Figure 7:
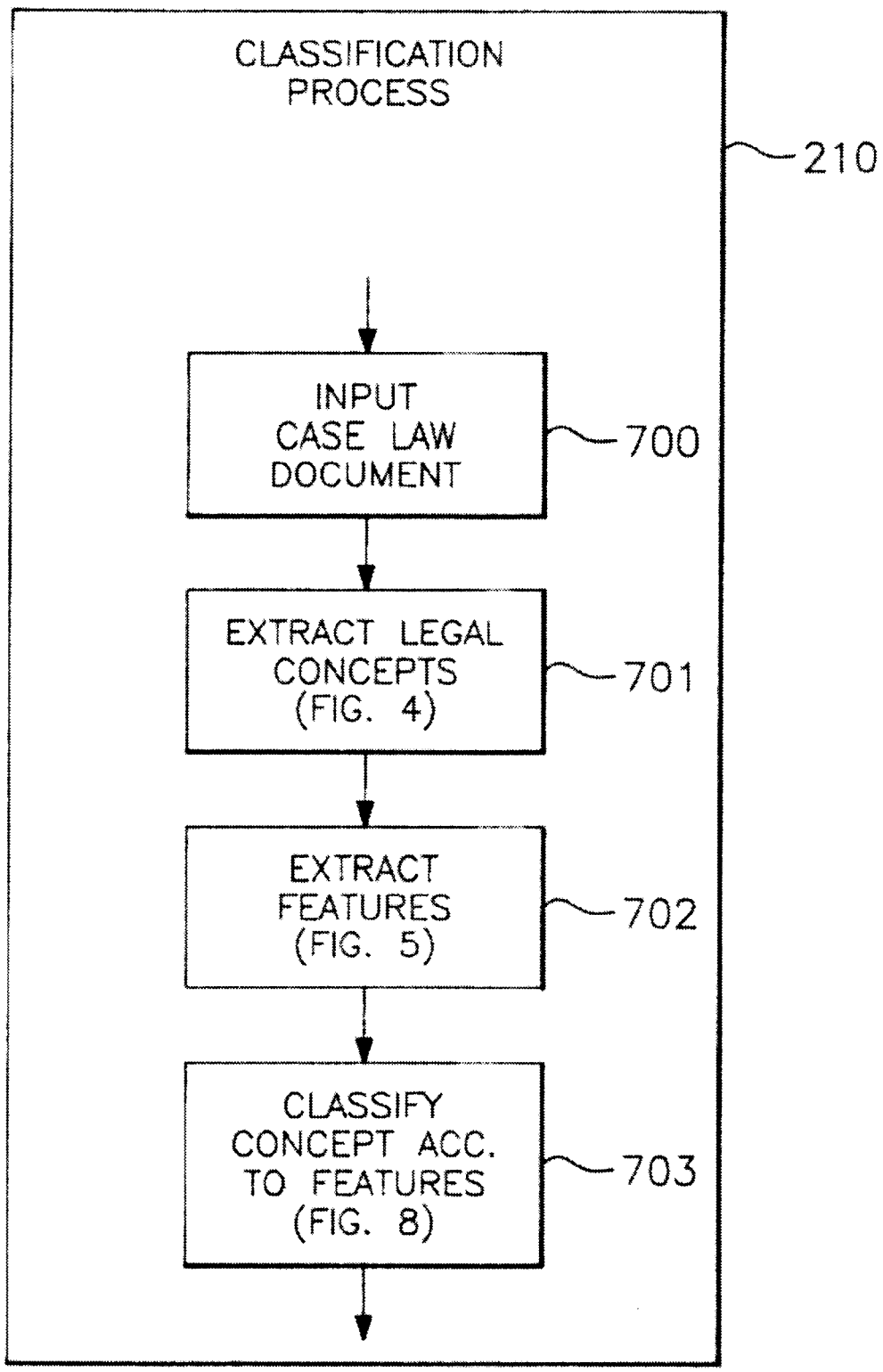
FIG. 7 is a flow chart indicating an exemplary embodiment of classification process 210 (FIG. 2).

The step of extracting legal concepts is used as step 301 during the training process shown in FIG. 3 and as step 701 during the classification process shown in FIG. 7. The details of steps 301 and 701 are illustrated in FIG. 4.

Figure 4:
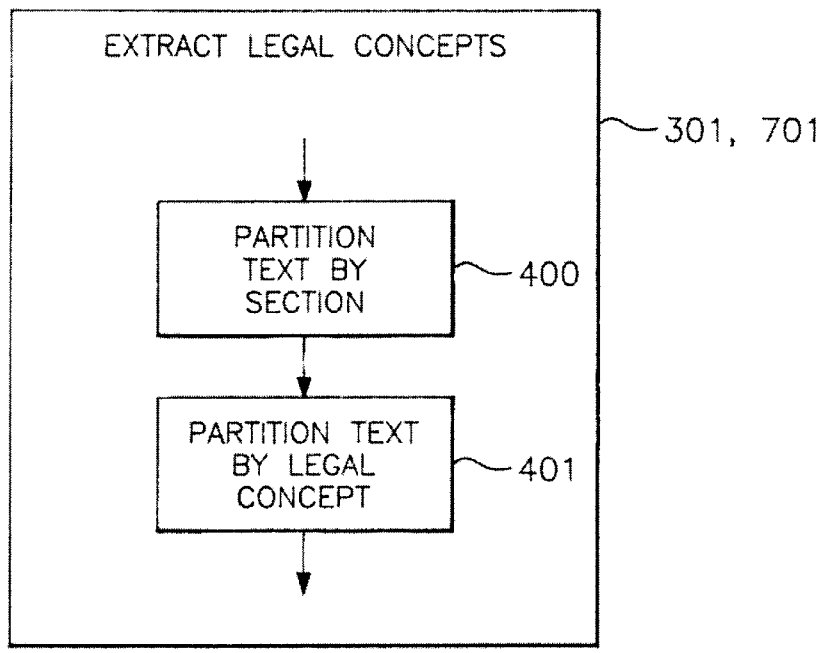
FIG. 4 is a flow chart indicating details of an exemplary legal concepts extraction step (301 from FIG. 3; 701 from FIG. 7).

Referring to FIG. 4, block 400 illustrates the partitioning of text accomplished when a case law document is parsed and partitioned by section, to identify the section containing legal concepts.

Then, as shown in block 401, the legal concept section is parsed and partitioned into individual legal concepts. Each legal concept is stored along with the topic(s) associated with that legal concept. If a legal concept has no topics from the target topic scheme, then that legal concept is discarded.

Figure 5:
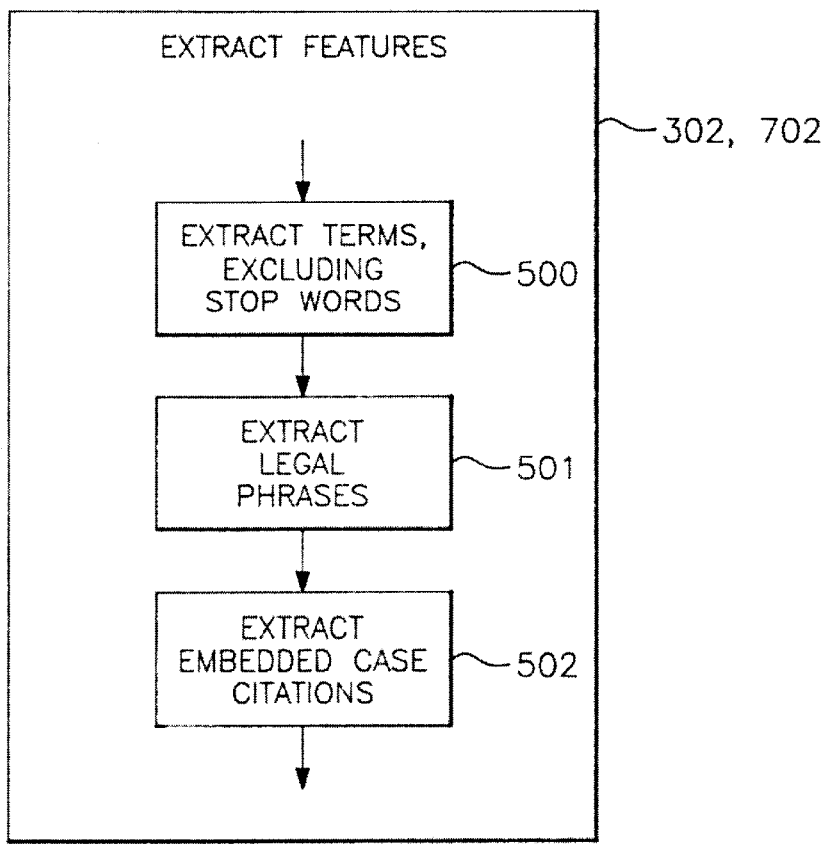
FIG. 5 is a flow chart indicating details of an exemplary feature extraction step (302 from FIG. 3; 702 from FIG. 7).

The feature extraction step, used as step 302 during training and step 702 during classification, is detailed in FIG. 5. This step involves extracting the features necessary for accurately classifying legal concepts, and is one of the primary objects of this invention. The format of the feature when associated with the legal concept depends on the format required by the learning method. Examples are given for the relevance-ranked classification step, described in more detail with reference to FIG. 8.

Referring more specifically to FIG. 5, each term in the legal concept is extracted from the text, as shown in step 500. However, all instances of stop-words from the stop-word list (see an example in Appendix C) are removed from the set of terms.

In step 501, legal phrases such as "criminal history", "custody dispute", "eminent domain" etc. are extracted as a feature. The legal concept is searched for legal phrases (see sample in Appendix D).

Finally, step 502 involves extracting cites to other case law documents, such as "People v. Medina (1995) 39 Cal. App. 4th 643, 650".

After features have been extracted, then relevance scores for each feature are generated. The generation of relevance scores includes:

the conversion of features into terms, the generation of term frequencies within legal concepts and across the set, the generation of (so-called) "document" frequencies (more aptly, concept frequencies), the generation of inverse "document" frequencies (more aptly, inverse concept frequencies), and the generation of relevance scores for each term.

Details of these steps are described as follows, with reference to FIG. 6.

A straightforward approach to using abstract features in a relevance-ranked approach is to simply convert each feature in a legal concept into a "term" (shown as step 600). In a particular preferred embodiment, a "term" is a mnemonic that uniquely distinguishes that feature from all other features.

For example, the legal phrase "administrative authority" can be easily converted to a "term" like "administrative_authority" (with an underline character between words). Or a case citation like "39 Cal. App. 4th 643" can be converted into a term like "39_CalApp4_643". In this way, each feature is converted into a term that is well-defined and unique across the set.

Then, as shown in block 601, for each "term" (including all features as well as words), the "term frequency" (TF) is calculated for each legal concept in which that term appears, using the number of occurrences of that term within the legal concept. The "average term frequency" (AVE_TF) of all terms in the legal concept is also calculated.

For each term, the total number of legal concepts in which a term occurs in the If training set is determined, as shown in block 602. This number is determined in the same way that the conventional "document" frequency (DF) is calculated. In the text searching art, the term "document" has many meanings and can thus be ambiguous. In this specification "document" has already been used to refer to the entire legal opinion and not to a concept that is a part of the opinion. Therefore, to avoid ambiguity, the expanded term "document frequency" will no longer be used in this specification. Instead, DF will continue to be used, with the understanding that in the context of this specification DF actually refers to a concept frequency.

Block 603 represents the calculation of how widely that term is used across the entire body of training legal concepts.

This calculation is made in the same way that the conventional inverse "document" frequency (IDF) is calculated. Because "document" is used in this specification to refer to an entire legal opinion, the expanded term "inverse document frequency" will no longer be used. However, it is understood that IDF actually refers to an inverse concept frequency. In any event, this calculation is made using the DF and the total number of legal concepts in the training set DBSIZE.

Next, for each term in a legal concept, a relevance score is then calculated, as shown in block 604. This calculation involves using the term frequency (TF) for that term-legal concept pair, the AVE_TF, that term's IDF, the length of the legal concept, and the overall average length of legal concepts in the set. This scoring technique is one of the primary objects of this invention.

Exemplary formulas for calculating the relevance score are:

if ($doclength > aveDocLength$):

$$TFwt = \frac{TF + TF/AVE\_TF}{TF + TF/AVE\_TF + 2(\alpha + \beta \times (doclength - aveDocLength)/aveDocLength)}$$

if ($doclength <= aveDocLength$):

$$TFwt = \frac{TF + TF/AVE\_TF}{TF + TF/AVE\_TF + 2(\alpha + \beta \times (aveDocLength - doclength + 1)/aveDocLength)}$$

$$IDF = \log\left(\frac{DBSIZE - DF + 0.5}{DF + 0.5}\right)$$

score=$TFwt \times IDF$ where:
- TFwt=Term frequency weight
- TF=Term frequency within current legal concept
- AVE_TF=Average term frequency of terms in the current legal concept
- $\alpha,\beta$=Scale factors, such that $\alpha+\beta=1$; exemplary values are $\alpha=0.4$ and $\beta=0.6$
- docLength=Length of current legal concept, in characters
- aveDocLength=Average length, in characters, of all legal concepts in training set
- IDF=Inverse "document" (i.e., concept) frequency for term across training set
- DBSIZE=Total number of legal concepts in training set
- DF="Document" frequency (Number of legal concepts in which a term occurs)
- score=Relevance score for term in a legal concept Finally, the results of various calculations are stored in knowledge base 201, as shown in block 304 (FIG. 3). The concept frequency DF and the relevance score for each term in a legal concept are stored in an "inverted index" in the knowledge base. As will readily be understood by those skilled in the art, an inverted index in this context is a list of each term, each legal concept in which it occurs, and the relevance score for that term-legal concept, such that the list can be easily searched by term.

Significantly, use of an inverted index greatly increases the scalability of the invention. This is because an inverted index provides for very efficient searching on features and allows for handling much larger bodies of training data. A portion of an exemplary inverted index, given legal concepts 23, 38, and 127, sorted by term, may be represented as in TABLE I.

Also saved in the knowledge base are the basic relationships between each legal concept and its associated topic(s), determined earlier in the general training process. This set of relationships establishes the link between terms in a legal concept and the topics relevant to those terms.

The Classification Process.

The training process 200 having been described in detail above, the inventive classification process 210 is now described. Shown in FIG. 7, the classification process 210 involves classifying legal concepts of an unknown topic according to a given topic scheme.

First, court case documents are input, as indicated at block 700. From each case, legal concepts are extracted, as shown in block 701. The extraction step 701 may be the same as step 301 used by the training process, shown in FIG. 4.

In block 702 (which may be the same as step 302 used by the training process, and shown in FIG. 5), features are extracted from each legal concept and are associated with that legal concept in a manner consistent with the training process used.

In concept classification step 703, each legal concept and its identified features are first input. Information gathered during training is input from the knowledge base. This information is used to generate a set of scores for the current legal concept, one each for the best-matching legal concepts in the training set. Then, the topics for the legal concept are determined. Block 703 involves using the features found in the current candidate legal concept, and comparing them to the features found in the training legal concepts. The topics associated with the training legal concepts found most similar to the legal concept in question are collated and sorted to determine the most relevant topics.

Figure 8:
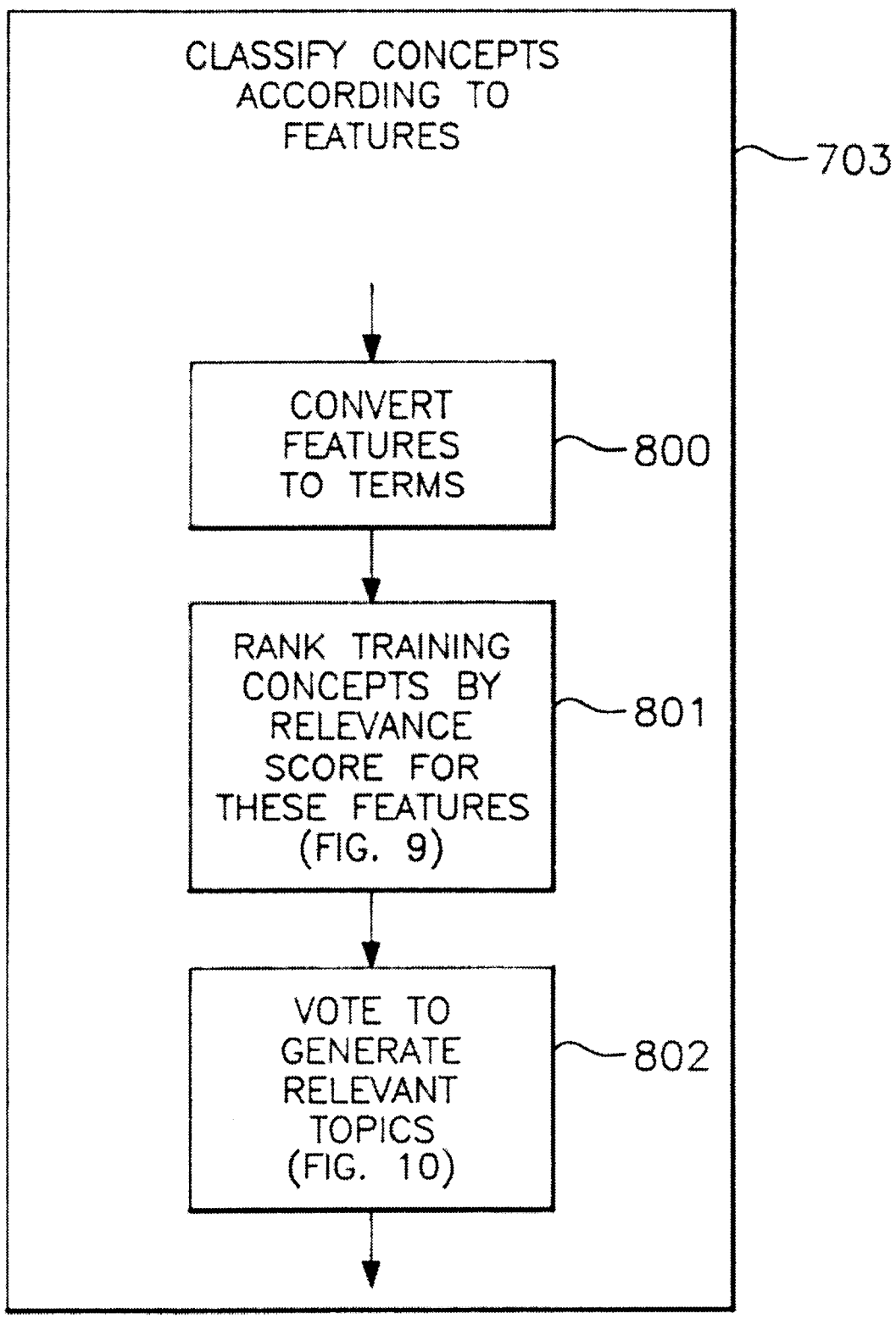
FIG. 8 is a flow chart representing details of an exemplary concept classification step 703 (FIG. 7).

A preferred embodiment of the concept classification step 703 (FIG. 7) is detailed in FIG. 8. The illustrated classification step uses frequency of features in the candidate legal concept to find similar legal concepts (and therefore similar topics) in the training knowledge base. The classification step, which may be termed a relevance-ranked classification step, includes:

analyzing input concept for features, ranking of training concepts by relevance score for these features, and voting on the topics associated with these training concepts to determine the best topics.

Figure 6:
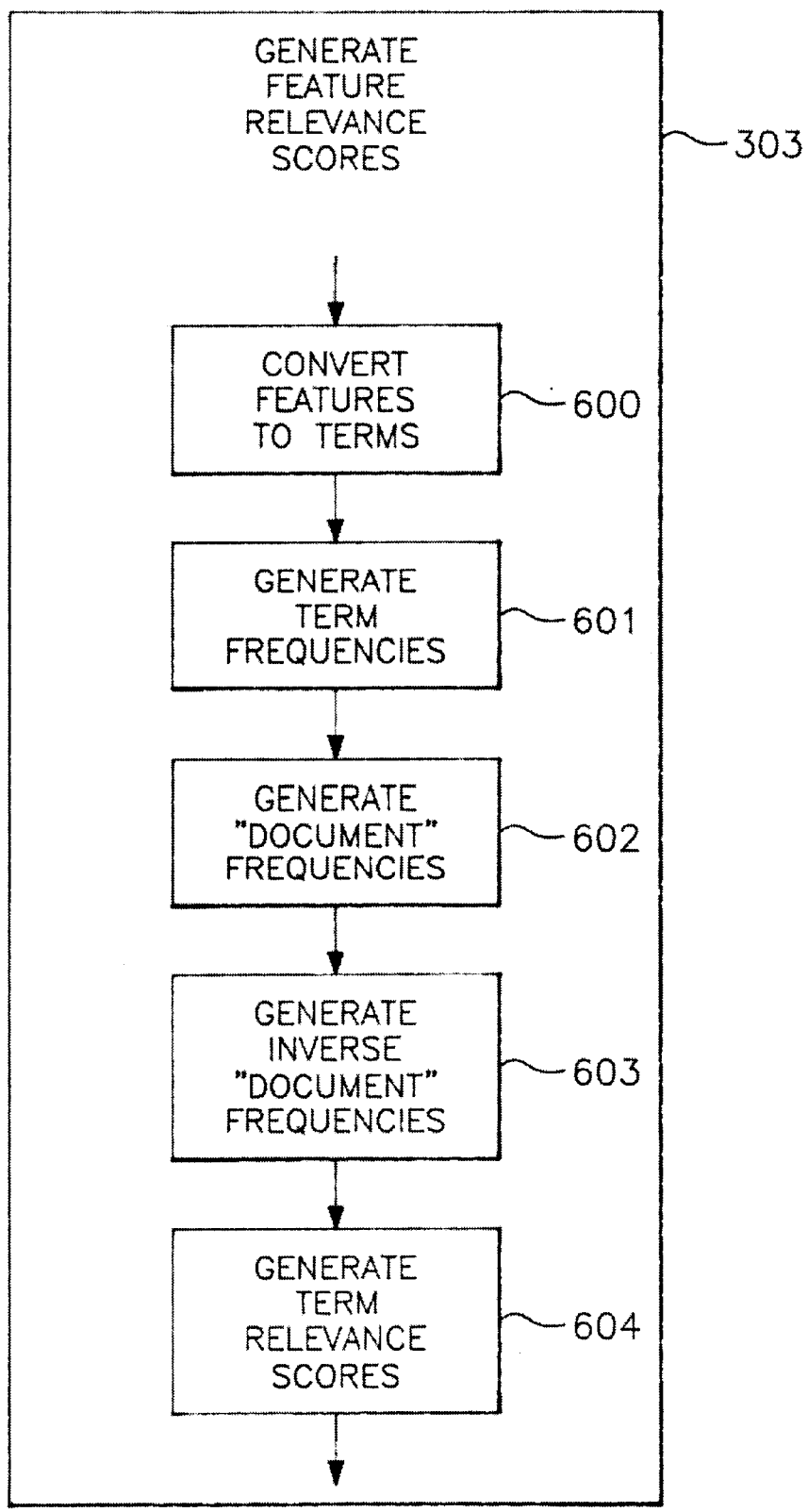
FIG. 6 is a flow chart representing details of an exemplary knowledge building step 303 (FIG. 3).

Block 800, a step of converting "features" to "terms", may be the same as that used by FIG. 6 block 600, described above.

In block 801, all training concepts are ranked by their relevance scores for these candidate terms.

Figure 9:
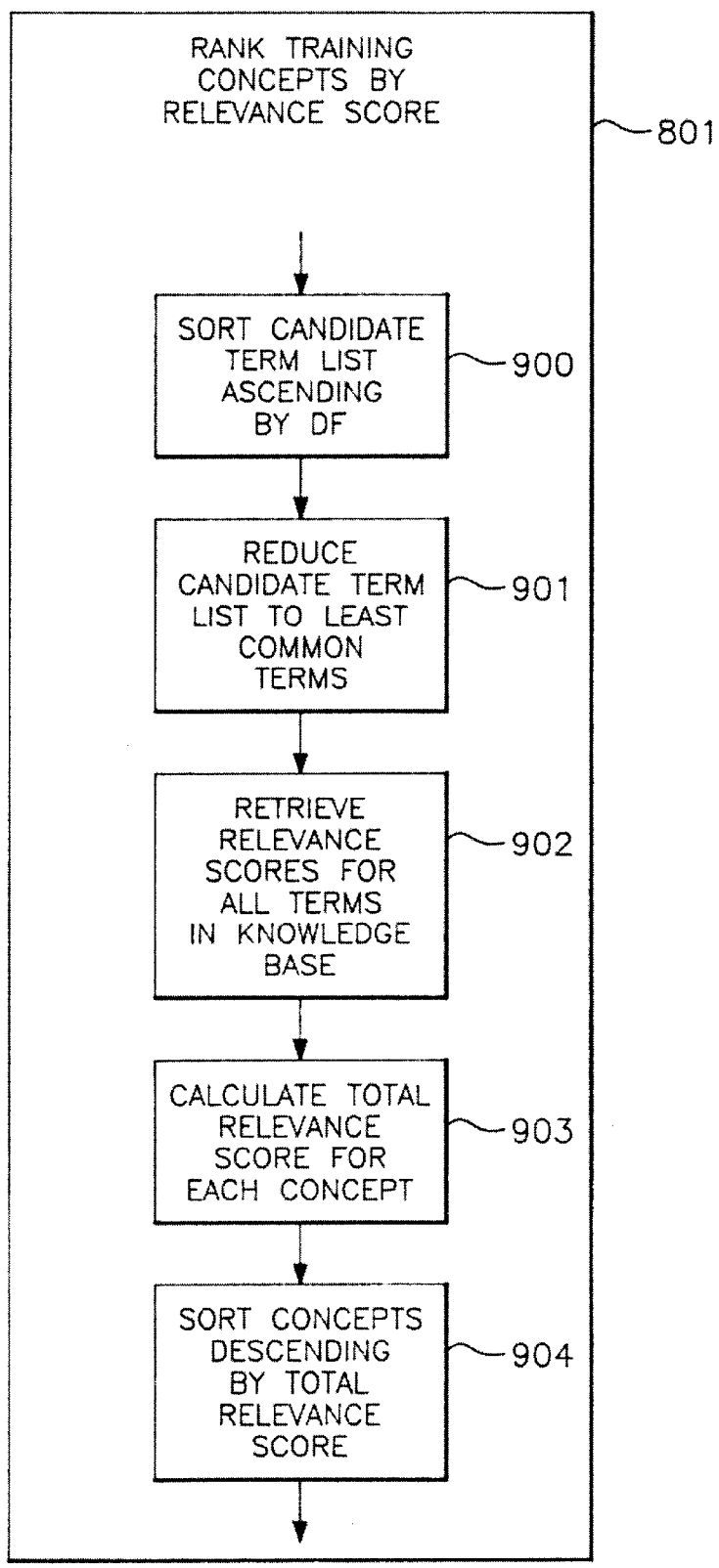
FIG. 9 is a flow chart illustrating details of an exemplary process 801 (FIG. 8) for ranking training concepts by relevance score.

A preferred embodiment of the ranking step 801 (FIG. 8) is detailed in FIG.9. Referring to FIG. 9, the first two steps, illustrated as blocks 900 and 901, are optional but are useful in optimizing for later steps.

In block 900, the list of candidate terms is sorted in ascending order by DF, retrieved from the knowledge base. This orders the term list from the least common terms to the most common terms.

Next, in block 901, the candidate term list is reduced to a selection of the least common terms in the list. This in turn reduces the processing required in subsequent ranking steps; the number of terms selected depends on the amount of optimization desired. For example, refer to Table II. If optional steps 900 and 901 are not used, subsequent required ranking steps operate on the entire list of candidate terms.

In block 902 the relevance scores for training concepts, for all terms in the candidate concept, are retrieved from the knowledge base.

In block 903, for every training concept, the relevance scores for the candidate terms are summed into a total relevance score for that training concept. Table III shows an exemplary set of five candidate terms with seven training legal concepts and their relevance scores. The relevance scores for each legal concept are totaled in the bottom row. This would give a list of training legal concepts with total relevance scores, such as shown in Table IV.

In block 904, the training concepts are sorted descending by these total relevance scores, resulting in the most similar training concepts being first in this sorted list. For example, sorting Table IV by total score yields the results in Table V. This sorted list generally indicates that the most relevant training legal concept for the current candidate concept is Concept 1, the next most relevant concept is Concept 9, and so forth down the list.

This completes discussion of the details of FIG. 8 block 801 as it may be implemented in FIG. 9.

Referring again to FIG. 8, in block 802, essentially a voting step, the topics associated with the training legal concepts that are most like the candidate legal concept are collated and sorted to generate a final list of relevant topics. In a final list of matching legal concepts, a single topic may be found more than once and therefore is more likely relevant to the candidate concept than topics found only once, for example.

Significantly, the voting process of block 802 distinguishes the more relevant topics from the less relevant topics. This voting technique is one of the primary objects of the invention.

Figure 10:
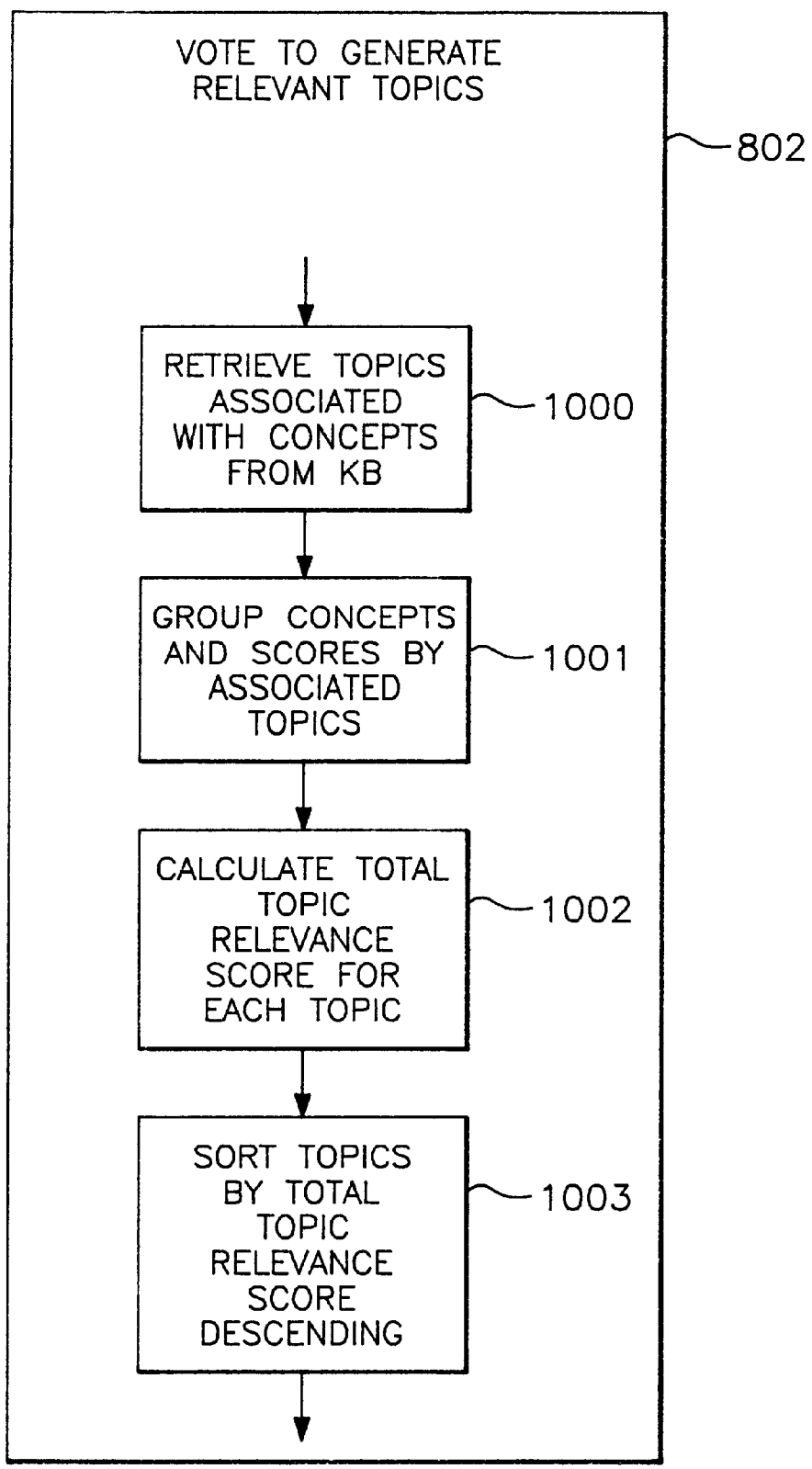
FIG. 10 is a flow chart illustrating details of an exemplary process 802 (FIG. 8) for voting to generate a list of relevant topics.

A preferred embodiment of the voting step 802 (FIG. 8) is detailed in FIG. 10. In block 1000, the topics associated with the sorted training concepts are retrieved from the knowledge base. Then, in block 1001, these training concepts and their scores are grouped by their topics. In block 1002, the total relevance score for each topic-group is calculated to determine a topic relevance score for that topic. Finally, in block 1003, the topics are then sorted descending by these topic relevance scores. The resulting list shows the most relevant topics first in the list.

Given a flat (non-hierarchical) topic scheme, a sample list of matching concepts before voting, with their topics and relevance scores, sorted by score, might look like TABLE VI.

Thus, before voting, the most relevant topics from this list would be, in order of appearance:

Admiralty Law

Transportation Law

Torts

Bankruptcy Law

After voting, the scores of all the topics are accumulated and the results re-sorted, would look like TABLE VII. So the list of relevant topics after voting would be sorted differently than that before voting:

Transportation Law (6.53)

Admiralty Law (4.55)

Torts (2.81)

Bankruptcy Law (0.68)

The "Transportation Law" topic becomes the most relevant topic after voting because its accumulated relevance score is higher than the accumulated scores of the other topics.

If the legal topic scheme is a hierarchical (multi-tier) topic scheme, a second hierarchical voting may be performed on the final relevant topics. The final topic list can be grouped by $1^{st}$-tier topic, by $2^{nd}$-tier topic, and so on, and then weighted according to occurrence at each tier. These weights are then considered in the final list of topics. This technique takes into consideration similar topics and can help to improve overall quality of the topics.

For example, the list of matching concepts, before hierarchical voting, with their topics and relevance scores, sorted by score, might look like TABLE VIII.

If the relevance scores for these topics are accumulated, first by Tier 1 to give CumT1, then by Tier 2 to give CumT2, then by Tier 3 to give CumT3 (assume only a 3-tier hierarchy for this example), the topic list looks like TABLE IX.

This list is then sorted highest to lowest score, first by Tier 1, then by Tier 2, and then by Tier 3, to give TABLE X.

This would be the final list of most relevant topics, sorted by relevance. This final list of topics might be represented hierarchically as follows:

Transportation Law
    Water Transportation & Shipping
        Vessel Safety
    Carrier Labilities & Duties
        Ratemaking
    Vehicle Transportation & Shipping
        Traffic Regulation
    Intrastate Commerce Regulation
    Foreign Commerce Regulation
Admiralty Law
    Cargo Care & Custody
        Liability Exemptions
        Liability
    Non-Cargo Liability
        Death Actions
        Jones Act
Torts
    Products Liability
        Negligence
    Strict Liability
        Abnormally Dangerous Activities
    Vicarious Liability
        Negligent Hiring & Supervision
Bankruptcy Law
    Property Use, Sale, or Lease Still other (optional) techniques can be used to further eliminate irrelevant topics. For example, if a topic's relevance score is below a predefined threshold, or if the number of times the topic occurs among the most relevant legal concepts is below a threshold, then that topic could be eliminated.

The inventive methods having been described above, the invention also encompasses apparatus (especially programmable computers) for carrying out classification of legal concepts. Further, the invention encompasses articles of manufacture, specifically, computer readable memory on which computer-readable code embodying the methods may be stored, so that, when the code is used in conjunction with a computer, the computer can carry out the training and classification processes.

A non-limiting, illustrative example of an apparatus that invention envisions for executing the foregoing methods, is described above and illustrated in FIG. 1: a computer or other programmable apparatus whose actions are directed by a computer program or other software.

Non-limiting, illustrative articles of manufacture (storage media with executable code) may include the memory 103 (FIG. 1), other magnetic disks, optical disks, "floppy" diskettes, ZIP disks, or other magnetic diskettes, magnetic tapes, and the like. Each constitutes a computer readable memory that can be used to direct a computer to function in a particular manner when used by the computer.

Those skilled in the art, given the preceding description of the inventive method, are readily capable of using knowledge of hardware, of operating systems and software platforms, of programming languages, and of storage media, to make and use apparatus for concept classification, as well as computer readable memory articles of manufacture which, when used in conjunction with a computer can carry out concept classification. Thus, the invention's scope includes not only the method itself, but apparatus and articles of manufacture.

Modifications and variations of the above-described embodiments of the present invention are possible, as appreciated by those skilled in the art in light of the above teachings. For example, the particular hardware on which the system and method are implemented, the programming languages and data formats involved, the inclusion or exclusion of optional steps, the nature of the concepts to be classified, the particular topic scheme used, and other details of implementation, may be varied while remaining within the scope of the present invention. It is therefore to be understood that, within the scope of the appended claims and their equivalents, the invention may be practiced otherwise than as specifically described.

TABLE I

| Term | Concept | Score |
|---|---|---|
| appellate | 23 | 0.08 |
| appellate | 38 | 0.12 |
| court | 23 | 0.01 |
| court | 127 | 0.02 |
| court | 38 | 0.01 |
| credibility | 23 | 0.23 |
| factfinder | 23 | 1.13 |
| factfinder | 127 | 1.04 |
| judqe | 38 | 0.05 |
| role | 23 | 0.57 |
| role | 38 | 0.88 |
| role | 127 | 0.42 |
| witnesses | 23 | 0.11 |
| witnesses | 38 | 0.08 |

TABLE II

| Term | DF |
|---|---|
| seaworthy | 1584 |
| seaworthy | 1584 |
| admiralty | 8092 |
| admiralty | 8092 |
| admiralty | 8092 |
| admiralty | 8092 |
| negligent | 12744 |
| negligent | 12744 |
| injure | 28939 |
| injure | 28939 |
| witness | 42677 |
| witness | 42677 |
| witness | 42677 |
| witness | 42677 |
| witness | 42677 |
| witness | 42677 |

TABLE III

| Term | Training Legal Concept | | | | | | |
|---|---|---|---|---|---|---|---|
| | 1 | 2 | 4 | 9 | 10 | 13 | 15 |
| seaworthy | 0.9997 | 0 | 0 | 0.6458 | 0 | 0 | 0 |
| seaworthy | 0.9997 | 0 | 0 | 0.6458 | 0 | 0 | 0 |
| admiralty | 0.8023 | 0 | 0 | 0.9322 | 0.7083 | 0 | 0.4016 |
| admiralty | 0.8023 | 0 | 0 | 0.9322 | 0.7083 | 0 | 0.4016 |
| admiralty | 0.8023 | 0 | 0 | 0.9322 | 0.7083 | 0 | 0.4016 |
| admiralty | 0.8023 | 0 | 0 | 0.9322 | 0.7083 | 0 | 0.4016 |
| negligent | 0.7922 | 0 | 0 | 0.5738 | 0 | 0 | 0.7992 |
| negligent | 0.7922 | 0 | 0 | 0.5738 | 0 | 0 | 0.7992 |
| injure | 0 | 0 | 0 | 0 | 0.9955 | 0 | 0 |
| injure | 0 | 0 | 0 | 0 | 0.9955 | 0 | 0 |
| witness | 0.1047 | 0.0882 | 0 | 0.0023 | 0 | 0.4771 | 0.1025 |
| witness | 0.1047 | 0.0882 | 0 | 0.0023 | 0 | 0.4771 | 0.1025 |
| witness | 0.1047 | 0.0882 | 0 | 0.0023 | 0 | 0.4771 | 0.1025 |
| witness | 0.1047 | 0.0882 | 0 | 0.0023 | 0 | 0.4771 | 0.1025 |
| witness | 0.1047 | 0.0882 | 0 | 0.0023 | 0 | 0.4771 | 0.1025 |
| witness | 0.1047 | 0.0882 | 0 | 0.0023 | 0 | 0.4771 | 0.1025 |
| TOTALS | 7.4212 | 0.5292 | 0 | 6.1818 | 4.8242 | 2.8626 | 3.8198 |

TABLE IV

| Training Legal Concept | Total Score |
|---|---|
| 1 | 7.4212 |
| 2 | 0.5292 |
| 4 | 0 |
| 9 | 6.1818 |
| 10 | 4.8242 |
| 13 | 2.8626 |
| 15 | 3.8198 |

TABLE V

| Training Legal Concept | Total Score |
|---|---|
| 1 | 7.4212 |
| 9 | 6.1818 |
| 10 | 4.8242 |
| 15 | 3.8198 |
| 13 | 2.8626 |
| 2 | 0.5292 |
| 4 | 0 |

TABLE VI

| Concept | Topic | Score |
|---|---|---|
| 1 | Admiralty Law | 1.53 |
| 2 | Admiralty Law | 1.27 |
| 3 | Transportation Law | 0.89 |
| 4 | Torts | 0.88 |
| 4 | Transportation Law | 0.88 |
| 5 | Transportation Law | 0.82 |
| 6 | Torts | 0.79 |
| 7 | Transportation Law | 0.74 |
| 8 | Transportation Law | 0.74 |
| 9 | Admiralty Law | 0.69 |
| 10 | Bankruptcy Law | 0.68 |
| 11 | Transportation Law | 0.68 |
| 12 | Transportation Law | 0.65 |
| 12 | Torts | 0.59 |
| 13 | Transportation Law | 0.58 |
| 14 | Transportation Law | 0.55 |
| 14 | Admiralty Law | 0.55 |

TABLE VI-continued

| Concept | Topic | Score |
|---|---|---|
| 14 | Torts | 0.55 |
| 15 | Admiralty Law | 0.51 |

TABLE VII

| Concept | Topic | Score |
|---|---|---|
| 1 | Admiralty Law | 1.53 |
| 2 | Admiralty Law | 1.27 |
| 9 | Admiralty Law | 0.69 |
| 14 | Admiralty Law | 0.55 |
| 15 | Admiralty Law | 0.51 |
|  |  | 4.55 |
| 4 | Torts | 0.88 |
| 6 | Torts | 0.79 |
| 12 | Torts | 0.59 |
| 14 | Torts | 0.55 |
|  |  | 2.81 |
| 3 | Transportation Law | 0.89 |
| 4 | Transportation Law | 0.88 |
| 5 | Transportation Law | 0.82 |
| 7 | Transportation Law | 0.74 |
| 8 | Transportation Law | 0.74 |
| 10 | Transportation Law | 0.68 |
| 11 | Transportation Law | 0.65 |
| 13 | Transportation Law | 0.58 |
| 14 | Transportation Law | 0.55 |
|  |  | 6.53 |
| 10 | Bankruptcy Law | 0.68 |
|  |  | 0.68 |

TABLE VIII

| Concept | Topic | Score |
|---|---|---|
| 1 | Admiralty Law -- Cargo Care & Custody -- Liability Exemptions | 2.03 |
| 2 | Admiralty Law -- Non-Cargo Liability - Death Actions | 1.33 |
| 3 | Transportation Law -- Vehicle Transportation & Shipping -- Traffic Regulation | 0.89 |
| 4 | Torts -- Strict Liability -- Abnormally Dangerous Activities | 0.88 |
| 4 | Transportation Law -- Water Transportation & Shipping -- Vessel Safety | 0.88 |
| 5 | Transportation Law -- Carrier Liabilites & Duties -- Ratemaking | 0.82 |
| 6 | Torts -- Products Liability -- Negligence | 0.79 |
| 7 | Transportation Law -- Intrastate Commerce Regulation | 0.74 |
| 8 | Transportation Law -- Water Transportation & Shipping -- Vessel Safety | 0.74 |
| 9 | Admiralty Law -- Cargo Care & Custody -- Liability Exemptions | 0.69 |
| 10 | Bankruptcy Law -- Property Use, Sale, or Lease | 0.68 |
| 10 | Transportation Law -- Foreign Commerce Regulation | 0.68 |
| 11 | Transportation Law -- Water Transportation & Shipping -- Vessel Safety | 0.65 |
| 12 | Torts -- Products Liability -- Negligence | 0.59 |
| 13 | Transportation Law -- Water Transportation & Shipping -- Vessel Safety | 0.58 |
| 14 | Transportation Law -- Carrier Liabilites & Duties -- Ratemaking | 0.55 |
| 14 | Admiralty Law -- Cargo Care & Custody -- Liability Exemptions | 0.55 |
| 14 | Torts -- Vicarious Liability -- Negligent Hiring & Supervision | 0.55 |
| 15 | Admiralty Law -- Non-Cargo Liability -- Jones Act | 0.51 |

TABLE IX

| Concept | Topic | Score | CumT1 | CumT2 | CumT3 |
|---|---|---|---|---|---|
| 9 | Admiralty Law -- Cargo Care & Custody -- Liability | 0.69 |  |  | 0.69 |
| 1 | Admiralty Law -- Cargo Care & Custody -- Liability Exemptions | 2.03 |  |  |  |
| 14 | Admiralty Law -- Cargo Care & Custody -- Liability Exemptions | 0.55 |  | 3.27 | 2.58 |
| 2 | Admiralty Law -- Non-Cargo Liability -- Death Actions | 1.33 |  |  | 1.33 |
| 15 | Admiralty Law -- Non-Cargo Liability -- Jones Act | 0.51 | 5.11 | 1.84 | 0.51 |
| 10 | Bankruptcy Law -- Property Use, Sale, or Lease | 0.68 | 0.68 | 0.68 | 0.68 |
| 6 | Torts - Products Liability -- Negligence | 0.79 |  |  |  |
| 12 | Torts -- Products Liability -- Negligence | 0.59 |  | 1.38 | 1.38 |
| 4 | Torts -- Strict Liability -- Abnormally Dangerous Activities | 0.88 |  | 0.88 | 0.88 |
| 14 | Torts -- Vicarious Liability -- Negligent Hiring & Supervision | 0.55 | 2.81 | 0.55 | 0.55 |
| 5 | Transportation Law -- Carrier Liabilities & Duties -- Ratemaking | 0.82 |  |  |  |
| 14 | Transportation Law -- Carrier Liabilities & Duties -- Ratemaking | 0.55 |  | 1.37 | 1.37 |
| 10 | Transportation Law -- Foreign Commerce Regulation | 0.68 |  | 0.68 | 0.68 |
| 7 | Transportation Law -- Intrastate Commerce Regulation | 0.74 |  | 0.74 | 0.74 |

TABLE IX-continued

| Concept | Topic | Score | CumT1 | CumT2 | CumT3 |
|---|---|---|---|---|---|
| 3 | Transportation Law -- Vehicle Transportation & Shipping -- Traffic Regulation | 0.89 | | 0.89 | 0.89 |
| 4 | Transportation Law -- Water Transportation & Shipping -- Vessel Safety | 0.88 | | | |
| 8 | Transportation Law -- Water Transportation & Shipping -- Vessel Safety | 0.74 | | | |
| 11 | Transportation Law -- Water Transportation & Shipping -- Vessel Safety | 0.65 | | | |
| 13 | Transportation Law -- Water Transportation & Shipping -- Vessel Safety | 0.58 | 6.53 | 2.85 | 2.85 |

TABLE X

| Topic | CumT1 | CumT2 | CumT3 |
|---|---|---|---|
| Transportation Law -- Water Transportation & Shipping -- Vessel Safety | 6.53 | 2.85 | 2.85 |
| Transportation Law -- Carrier Liabilities & Duties -- Ratemaking | | 1.37 | 1.37 |
| Transportation Law -- Vehicle Transportation & Shipping -- Traffic Regulation | | 0.89 | 0.89 |
| Transportation Law -- Intrastate Commerce Regulation | | 0.74 | 0.74 |
| Transportation Law -- Foreign Commerce Regulation | | 0.67 | 0.67 |
| Admiralty Law -- Cargo Care & Custody -- Liability Exemptions | 5.11 | 3.27 | 2.58 |
| Admiralty Law -- Cargo Care & Custody -- Liability | | | 0.69 |
| Admiralty Law -- Non-Cargo Liability -- Death Actions | | 1.33 | 1.33 |
| Admiralty Law -- Non-Cargo Liability -- Jones Act | | | 0.51 |
| Torts - Products Liability -- Negligence | 2.81 | 1.38 | 1.38 |
| Torts -- Strict Liability -- Abnormally Dangerous Activities | | 0.88 | 0.88 |
| Torts -- Vicarious Liability -- Negligent Hiring & Supervision | | 0.55 | 0.55 |
| Bankruptcy Law -- Property Use, Sale, or Lease | 0.68 | 0.68 | 0.68 |

APPENDICES

APPENDIX A - LEGAL CONCEPTS

APPENDIX B - HIERARCHICAL TOPIC SCHEME

APPENDIX C - STOP-WORD LIST

APPENDIX D - LEGAL PHRASE LIST

Concerning the content of the following Appendices, see the copyright notice at the beginning of the specification.

APPENDIX A

Exemplary LEGAL CONCEPTS (Points of Law, etc.)
Concepts Listed beneath respective Legal Topics from Hierarchical Legal Topic Scheme 1. Civil Procedure--Injunctions--Permanent Injunctions
   Civil Procedure--Appeals--Standards of Review--Abuse of Discretion
   The grant or denial of an injunction is solely within the trial court's discretion and, therefore, a reviewing court should not disturb the judgment of the trial court absent a showing of a clear abuse of discretion. An abuse of discretion involves more than an error of judgment. It is an attitude on the part of the court that is unreasonable, unconscionable, or arbitrary.
2. Civil Procedure--Appeals--Standards of Review--Abuse of Discretion
   A reviewing court should presume that the trial court's findings are accurate, since the trial judge is best able to view the witnesses and observe their demeanor, gestures, and voice inflections and use these observations in weighing the credibility of the witnesses.
3. Contract Law--Consideration--Mutual Obligation
   For a contract to be enforceable, it must be supported by consideration.
4. Labor & Employment Law--Employment at Will
   Since an employer is not legally required to continue the employment
   of an employee at-will, continued employment is consideration for the contract not to compete.
5. Labor & Employment Law--Trade Secrets & Unfair Competition--Noncompetition Agreements
   A covenant restraining an employee from competing with his former employer upon termination of employment is reasonable if it is no greater than is required for the protection of the employer, does not impose undue hardship on the employee, and is not injurious to the public. Only those covenants which are reasonable will be enforced.

APPENDIX B

Section from an exemplary
HIERARCHICAL LEGAL TOPIC SCHEME

Admiralty Law
Arbitration
Bankruptcy
Bills of Lading
Cargo Care & Custody
Due Diligence
General Average
Liability
Liability Exemptions
Limitation of Liability
Charter Parties
Contribution & Indemnity
Insurance
Jurisdiction
Law of Salvage
Liens & Mortgages
Negligence & Unseaworthiness
Non-Cargo Liability
Death Actions
Jones Act
Longshore & Harbor Workers' Compensation Act
Penalties & Forfeitures
Antitrust & Trade Regulation
Sherman Act
Clayton Act
Robinson-Patman Act
Federal Trade Commission Act
Market Definition

APPENDIX B-continued

Section from an exemplary
HIERARCHICAL LEGAL TOPIC SCHEME

Restraints of Trade & Price Fixing
Exclusive or Reciprocal Dealing
Horizontal Market Allocation
Horizontal Refusals to Deal
Horizontal Restraints
Per Se Rule & Rule of Reason
Tying Arrangements
Vertical Price Restraints
. . .
[items purposely omitted]

APPENDIX C

Selection from an exemplary
STOP-WORD LIST

A
ABLE
ABOUT
ABOVE
ACCORDING
ACROSS
AFTER
AGAIN
AGAINST
AGO
ALL
ALLOW
ALLOWED
ALLOWING
ALLOWS
ALMOST
ALONE
ALONG
ALREADY
ALSO
ALTHOUGH
ALWAYS
. . .
[Items purposely omitted]
WHATEVER
WHEN
WHERE
WHETHER
WHICH
WHILE
WHO
WHOLE
WHOSE
WHY
WILL
WITH
WITHIN
WITHOUT
WON
WOULD
WOULDN
YESTERDAY
YET
YOU
YOUR
YOURS
YOURSELF

APPENDIX D

Selection from an exemplary
LEGAL PHRASE LIST

14th amendment
4th ed

APPENDIX D-continued

Selection from an exemplary
LEGAL PHRASE LIST

5th ed
6th ed
8th ed
abatement act
abettor statute
abnormal sexual interest
absent class member
absent evidence
absolute bar
absolute discretion
absolute divorce
absolute duty
absolute equality
absolute immunity
absolute priority rule
absolute privilege
absolute right
absolute title
abstention principle
abstract book
abuse-of-discretion standard
ad damnum
ad damnum clause
ad valorem
ad valorem tax
additional evidence
additional fact
additional peremptory challenge
additional punishment
additional suspect
adequate consideration
adequate notice
adequate record
adequate remedy
. . .
[items purposely omitted]
zoning appeal
zoning authority
zoning case
zoning enabling act
zoning law
zoning regulation

We claim:

1. A computer-implemented method of building a knowledge base for a legal topic classification system, the method comprising:
   inputting a plurality of training documents;
   parsing the plurality of training documents to extract classified legal concepts;
   extracting features from the legal concepts;
   generating relevance scores for each feature; and
   storing features, topics, and relevance scores in a knowledge base, using an inverted index.

2. The method as set forth in claim 1, the step of parsing comprising the steps of:
   partitioning the text by section; and
   partitioning the text by legal concept.

3. The method as set forth in claim 1, the step of extracting features comprising the steps of:
   extracting terms, excluding stop words;
   extracting legal phrases; and
   extracting embedded case citations.

4. The method as set forth in claim 1, the step of generating relevance scores including the steps of:
   converting features to terms;
   generating, for each training concept, term frequency (TF) for each term, as number of occurrences of that term in that training concept;

generating, for each training concept, document frequency (DF) for each term, as total number of training concepts in which term appears;

generating inverse document frequency (IDF) for each term; and generating a relevance score for each term for each concept.

5. A computer-implemented method of building a knowledge base for a legal topic classification system, the method comprising:

analyzing previously classified legal concepts to determine distinguishing features for each concept;

generating relevance scores for each feature in each training concept; and storing features, topics, and relevance scores in a knowledge base, using an inverted index.

6. The method as set forth in claim 5, the step of generating relevance scores including the steps of:

converting features to terms;

generating, for each training concept, term frequency (TF) for each term, as number of occurrences of that term in that training concept;

generating, for each training concept, average term frequency of terms;

generating, for each training concept, document frequency (DF) for each term, as total number of training concepts in which term appears;

determining DBSIZE as total number of training concepts in knowledge base;

generating inverse document frequency (IDF) for each term; and generating a relevance score for each term for each concept.

7. The method as set forth in claim 6, wherein the step of generating IDF is performed using the formula, $\log((DBSIZE-DF+0.5)/(DF+0.05))$.

8. A computer-implemented method of processing an input concept from a document text to provide, from a topic scheme, a list of one or more topics that are relevant to the input concept, the method comprising:

analyzing the input concept to arrive at a set of distinguishing features;

converting candidate concept features to candidate terms;

searching a database of concepts, previously classified according to the topic scheme, for concepts similar to the input concept based on features;

ranking the similar concepts based on relevance score; and voting on topics associated with the concepts within the database to form the list of topics relevant to the input concept.

9. The method as set forth in claim 8, the step of ranking including the steps of:

retrieving, for each training concept, relevance scores from a knowledge base for all candidate terms;

calculating total relevance score for each training concept, as a sum of candidate term relevance scores for that concept; and sorting training concepts by total relevance scores.

10. The method as set forth in claim 9, the step of ranking further including, before the step of retrieving, the steps of:

sorting candidate terms by document frequency (DF) of each term, as number of knowledge base training concepts in which term occurs; and reducing candidate term list to least common terms.

11. The method as set forth in claim 8, the step of voting including the steps of:

retrieving topics associated with each training concept from a knowledge base;

grouping training concepts and scores by associated topics;

calculating a total topic relevance score for each topic, as a sum of training concept scores for each topic; and sorting topics by total topic relevance score to create a topic list.

12. The method as set forth in claim 11, further comprising, within a hierarchical topic scheme, the steps of:

grouping topics by tier;

weighting the topic list according to number of occurrences of each tier topic;

generating a final topic list using the weighted topic list; and sorting the final topic list by tier.

13. The method as set forth in claim 11, the step of sorting including comparing each total topic relevance score to a threshold and eliminating from the topic list those topics having a total topic relevance score below the threshold.

14. The method as set forth in claim 11, the step of sorting including the steps of:

determining a number of times each topic occurs;

comparing the number to a threshold; and eliminating from the topic list those topics having a number of occurrences below the threshold.

15. A computer-implemented method of processing an input concept from a document text to provide, from a topic scheme incorporating a plurality of training concepts, a list of one or more topics that are relevant to the input concept, the method comprising:

retrieving topics associated with the training concepts from a knowledge base, the training concepts having been previously classified and scored in accordance with the topic scheme;

grouping training concepts and scores by associated topics;

calculating a total topic relevance score for each topic, as a sum of training concept scores for each topic; and sorting topics by total topic relevance score to create a topic list relevant to the input concept.

16. The method as set forth in claim 15, further comprising, within a hierarchical topic scheme, the steps of:

grouping topics by tier;

weighting the topic list according to number of occurrences of each tier topic;

generating a final topic list using the weighted topic list; and sorting the final topic list by tier.

17. A computer-implemented method of processing an input concept from a document text to identify, within a knowledge base incorporating a plurality of training concepts, concepts similar to the input concept and to rank these similar concepts, the method comprising:

identifying features of the input concept as candidate terms;

retrieving, from the knowledge base, relevance scores for training concepts similar to the input concept;

calculating a total relevance score for each retrieved training concept, as a sum of candidate term relevance scores for that concept; and sorting retrieved training concepts by total relevance scores.

18. A computer-implemented method of building a knowledge base for a legal topic classification system by identifying features within previously classified training concepts and generating relevance scores for these features, the method comprising the steps of:

converting the features into terms;

generating, for each training concept, term frequency (TF) for each term, as number of occurrences of that term in that training concept;

generating, for each training concept, average term frequency (AVE_TF) of terms;

generating, for each training concept, document frequency (DF) for each term, as total number of training concepts in which term appears;

determining training set DBSIZE as total number of training concepts in the knowledge base;

generating inverse document frequency (IDF) for each term; and generating a relevance score for each term for each concept.

19. The method as set forth in claim 18, wherein when a length of a current concept, doclength, is greater than an average length of concepts in a set, aveDocLength, the relevance score is calculated using the formula TFwt×IDF, where $$TFwt = \frac{TF + TF/\text{AVE\_TF}}{TF + TF/\text{AVE\_TF} + 2(\alpha + \beta \times (doclength - aveDocLength)/aveDocLength)}$$

and IDF=log ((DBSIZE−DF+0.5)/(DF+0.05)).

20. The method as set forth in claim 18, wherein when a length of a current concept, doclength, is less than or equal to an average length of concepts in a set, aveDocLength, the relevance score is calculated using the formula TFwt×IDF, where $$TFwt = \frac{TF + TF/\text{AVE\_TF}}{TF + TF/\text{AVE\_TF} + 2(\alpha + \beta \times (aveDocLength - doclength + 1)/aveDocLength)}$$

and IDF=log ((DBSIZE−DF+0.5)/(DF+0.05)).

* * * * *